United States Patent
Ezequiel

(10) Patent No.: US 9,521,352 B2
(45) Date of Patent: Dec. 13, 2016

(54) TELEVISION SET CAPABLE OF IDENTIFYING A PLURALITY OF PERIPHERALS AND ALLOWING TO SELECT AND DISPLAY THE CONTENTS OF ONE OF THE SAME

(75) Inventor: Ruiz Rodriguez Ezequiel, Panama (PA)

(73) Assignee: NAXOS FINANCE SA, Luxembourg (LU)

( * ) Notice: Subject to any disclaimer, the term of this patent is extended or adjusted under 35 U.S.C. 154(b) by 0 days.

(21) Appl. No.: 14/427,813

(22) PCT Filed: Sep. 13, 2012

(86) PCT No.: PCT/EP2012/067952
§ 371 (c)(1),
(2), (4) Date: May 13, 2015

(87) PCT Pub. No.: WO2014/040626
PCT Pub. Date: Mar. 20, 2014

(65) Prior Publication Data
US 2015/0271434 A1 Sep. 24, 2015

(51) Int. Cl.
*H04N 21/485* (2011.01)
*H04N 5/44* (2011.01)
(Continued)

(52) U.S. Cl.
CPC .......... *H04N 5/4403* (2013.01); *H04N 5/4401* (2013.01); *H04N 5/44543* (2013.01);
(Continued)

(58) Field of Classification Search
CPC ............ H04N 21/4622; H04N 1/00442; H04N 21/482
See application file for complete search history.

(56) References Cited

U.S. PATENT DOCUMENTS

| | | | | |
|---|---|---|---|---|
| 5,748,239 A | * | 5/1998 | Klees ..................... | G03B 17/48 348/373 |
| 2004/0022523 A1 | * | 2/2004 | Duerr ................... | G11B 19/122 386/231 |

(Continued)

FOREIGN PATENT DOCUMENTS

KR    10-0747518    8/2007

OTHER PUBLICATIONS

International Search Report for Application No. PCT/EP2012/067952 dated May 7, 2013.
(Continued)

*Primary Examiner* — Michael Teitelbaum
(74) *Attorney, Agent, or Firm* — Frommer Lawrence & Haug LLP

(57) ABSTRACT

A television set including: interfaces for receiving peripheral sources; a screen for displaying at least one of said sources; a graphic-indications generator for showing on said screen indications relating to said interfaces; a control unit; control means for issuing commands to said television set; a video memory for storing video images obtained by processing said peripheral sources; and a processing means for reducing the dimensions of said peripheral sources to generate said video images and associating said video images to respective graphic indications relating to said interfaces. The association result is displayed on the screen, as a general video image, to allow user to identify the interface associated with the corresponding video image. A pointing element is used to select one of said video images. In response to a command issued by said control means, the contents of said selected video image are shown on said screen in full-screen form.

20 Claims, 5 Drawing Sheets

(51) Int. Cl.
  *H04N 5/445* (2011.01)
  *H04N 21/431* (2011.01)
  *H04N 21/436* (2011.01)
  *H04N 21/4402* (2011.01)
  *H04N 21/442* (2011.01)
  *H04N 21/482* (2011.01)

(52) U.S. Cl.
  CPC ..... *H04N 21/4312* (2013.01); *H04N 21/4316* (2013.01); *H04N 21/43615* (2013.01); *H04N 21/43622* (2013.01); *H04N 21/44227* (2013.01); *H04N 21/44231* (2013.01); *H04N 21/440263* (2013.01); *H04N 21/440281* (2013.01); *H04N 21/482* (2013.01); *H04N 21/485* (2013.01); *H04N 21/4856* (2013.01); *H04N 2005/4407* (2013.01); *H04N 2005/4416* (2013.01); *H04N 2005/4442* (2013.01); *H04N 2005/44556* (2013.01)

(56) References Cited

U.S. PATENT DOCUMENTS

| | | |
|---|---|---|
| 2004/0075770 A1 | 4/2004 | Lee |
| 2006/0064719 A1* | 3/2006 | Youden .............. H04N 5/44591 725/38 |
| 2007/0064811 A1* | 3/2007 | Zador ................. H04N 5/4401 375/240.26 |
| 2008/0313674 A1* | 12/2008 | Dunton ............. G06F 17/30017 725/43 |
| 2009/0303197 A1 | 12/2009 | Bonczek et al. |
| 2011/0134325 A1* | 6/2011 | Ahn ................... H04N 21/4263 348/569 |

OTHER PUBLICATIONS

Korean Office Action for application No. 10-2015-7009294 dated Mar. 7, 2016.

* cited by examiner

TELEVISION SET CAPABLE OF IDENTIFYING A PLURALITY OF PERIPHERALS AND ALLOWING TO SELECT AND DISPLAY THE CONTENTS OF ONE OF THE SAME

The present application claims priority from PCT Patent Application No. PCT/EP2012/067952 filed on Sep. 13, 2012, the disclosure of which is incorporated herein by reference in its entirety.

FIELD OF THE INVENTION

The present invention relates to a television set capable of identifying a plurality of peripherals and allowing to select and display the contents of one of the same. For example, at least one of said peripherals is a video, peripheral connected to an input of a television receiver.

It is known in the art that modern television sets may comprise many types of interfaces (up to about ten), such as, for example, a coaxial interface for the television antenna, a SCART ("Syndicat des Constructeurs d'Appareils Radioré-cepteurs et Téléviseurs") interface, an optical HDMI ("High Definition Multimedia Interface"), a VGA ("Video Graphics Array") interface, and "Component Video" interfaces such as RGB ("Red Green Blue"), "Component YPbPr", DVI ("Digital Visual Interface") and S-Video ("Separate Video" or "Super Video"). Wireless interfaces also exist, such as, for example, Wi-Fi ("Wireless-Fidelity"), Bluetooth or NFC ("Near Field Communication").

In the present invention, the term "source" will refer to a source or string of video and/or audio data coming from a peripheral, e.g. a DVD ("Digital Versatile Disk", "Digital Video Disk") reader or a multimedia platform, and being sent to a television set through an interface.

Usually those television sets which are equipped with the above-mentioned interfaces also include a menu that allows the user to configure parameters pertaining to the image or the audio of the television set itself; it is also known that said menus allow to choose a peripheral for displaying the contents thereof.

The peripheral selection menu generally consists of a list of options that can be selected by the user, showing for each option the name of the corresponding interface. For example, the names assigned to the interfaces may be "EXT1", "EXT2", "HDMI1", "HDMI2", "VGA" and "TV"; where "EXT1" is the name given, for example, to the first SCART interface, "HDMI1" is the name given to the first HDMI interface, "VGA" is the name given to the VGA interface, and so on.

In other known forms, instead, the peripherals can be chosen by using an actuating means available on a television control device. At each actuation, the actuating means cyclically switches the visualization of the peripheral sources; a scan of the interfaces available in the television set is thus carried out, wherein each of them corresponds to a single source.

By way of example, the following associations are possible between a peripheral source and an interface of the television set; DVB-T2 source ("Digital Video Broadcasting-Second Generation Terrestrial") inputted to the "TV" interface, source of a DVD reader inputted to the "EXT1" interface, source of a BD ("Blu-ray Disc") reader inputted to the "HDMI1" interface, source of a multimedia platform inputted to the "HDMI2" interface, and source of a personal computer inputted to the "VGA" interface. It is therefore clear that there is a wide selection of sources, and hence of peripherals associated therewith.

Furthermore, the integration of RF ("Radio Frequency") modules within the hardware of the television set has made it possible to establish wireless connections between the television set and other peripherals adapted to transmit data through radio frequency. Such television sets can therefore be used for displaying multimedia contents (as well as other contents) of other peripherals connected thereto via a wireless connection. For example, through the DLNA (Digital Living Network Alliance) standard it is possible to connect a "Smartphone" or a game console to the television set through a wireless connection (Wi-Fi) and display the contents of the "Smartphone" or of the console on the television set. In this case, the Wi-Fi interface will be just one more interface selectable from the menu of the television set, in addition to those already mentioned above.

The menus of some television sets currently available on the market allow the user to choose the desired peripheral by means of a graphic indication that highlights the interface name, but not on the basis of the contents of the associated peripheral. Other menus also allow the user to modify a text field that univocally describes the interface and the associated peripheral.

With reference to FIG. 1, in a first example of prior art the reproduction means 3 of the television set displays a menu that comprises a first column 5 and a second column 7. The first column 5 contains first text fields 5a, 5b, 5c and 5d, which indicate the interface names, whereas the second column 7 contains second text fields 7a, 7b, 7c and 7d, which univocally describe the corresponding peripheral and can be defined at will by the user. Since the associations between the interfaces and the peripherals are not known a priori, the second text fields 7a, 7b, 7c and 7d must be set manually by the user in such a way as to make it easy to understand which peripheral is associated with the corresponding interface. For example, with reference to FIG. 1, the interface "EXT 1" is associated with the peripheral "VHS".

For example, in the television sets of the LC-46LE925 "AQUOS" series manufactured by Sharp, each peripheral connected to the television set can be labeled with a custom description that the user has to enter via a software keyboard displayed on the screen.

It is however clear that such easiness of understanding can only be attained after the user has entered a specific indication. In fact, in said first example the user cannot know a priori which peripheral is associated with the interface, if the user himself/herself has not entered a description into the second text field 7a, 7b, 7c and 7d of the menu. In particular, assuming that the user wants to select a desired peripheral and has not previously entered the desired description into the second text field 7a, 7b, 7c and 7d of the menu, then the user will have to search for the desired peripheral among all possible interfaces. To do so, if the peripheral is on (otherwise it cannot be found), the user must select every single interface listed in the menu and wait for the content of the source of the peripheral to be displayed in real time on the screen of the television set, and then repeat this operation for all interfaces until he/she finds the desired peripheral. This peripheral scan may require a long time and be tedious for the user.

Furthermore, for example, if there is a text description "VHS" associated with the interface "EXT 1" and then the user connects another peripheral to that interface, he/she will also have to change the text description in the corresponding second text field 7a, 7b, 7c and 7d; otherwise, the second text field 7a, 7b, 7c and 7d will contain a wrong text description of the peripheral.

In a second example of prior art, referring to FIG. 2, the user can identify the desired peripheral through a graphic indication 9 that represents the interface name; however, said graphic indication 9 is not included in a menu. In fact, the graphic indication 9 appears in a corner of the screen 8 of the television set 11, superimposed on the content of the source of the currently selected peripheral. Every time the user actuates an actuating means for peripheral switching, available on a control device of the television set, the graphic indication will change simultaneously with the content of the peripheral source.

In the above-mentioned second example, the user is not even given the possibility of entering a text description to be associated with the interface in order to be able to understand which peripheral it corresponds to, and therefore the user will have to search for the desired peripheral among all possible interfaces. To do so, if the peripheral is on, the user will have to select every single interface and wait a few seconds, at each access, for the content of the peripheral source to be displayed on the television set, and then repeat this operation for all interfaces until he/she finds the desired peripheral. If there are many interfaces, this process can become particularly time-consuming and tedious for the user.

Furthermore, when a peripheral is connected to the television set through the Wi-Fi interface, the user cannot establish a priori which peripheral is connected at a given time. A smartphone, a tablet or a personal computer might be connected at the same time to the television set through the Wi-Fi interface.

It is therefore apparent from the above examples that in the current state of the art it is difficult, time-consuming, tedious and tiresome for the user to identify the interface associated with the desired peripheral and quickly display the contents of the source provided by that peripheral.

Aiming at overcoming the above-mentioned problem, it is known in the art that SCART interfaces can include an automatic peripheral switching function, which uses a direct voltage signal on a pin of the SCART socket; however, this automatic switching only takes place during the transition from the off state to the on state of the peripheral connected to the television set via the SCART interface.

In fact, if a first peripheral connected to the television set through a first SCART interface is on and is transmitting a first source, and the user has chosen to display a second source of a second peripheral connected to a second interface after having turned on the first peripheral, in order to select the first peripheral connected to the first SCART interface again the user must necessarily carry out a scan of every single interface and wait a considerable length of time for the content of the first source to be displayed on the reproduction means, and then repeat this operation for all interfaces until he/she finds the desired source associated with the first peripheral.

In this case as well, it is time-consuming, difficult and tiresome for the user to identify the interface associated with the desired peripheral and quickly display the contents of the source thereof.

The HDMI-CEC ("HDMI-Consumer Electronic Control") digital standard includes a number of functionalities, one of which is automatic switching to the source corresponding to a peripheral which has just been turned on; this standard has, however, the same limitations as the above-described SCART case. Moreover, the television set and the peripherals connected thereto must all necessarily include the CEC protocol, otherwise said automatic switching will not occur.

U.S. patent document no. US2009/0303197 describes the use of a touch-sensitive display device that displays in real time a stream of a content of a video source. Through the touch-sensitive display device, one can associate a stream to an apparatus, such as a television set or a simple monitor, located in a household environment. For example, if the touch-sensitive display device is set to display the content of the "ESPN" channel of the video source "Satellite Stream" on a display apparatus located in the bedroom, an association is made between one of the many contents of the video source "Satellite Stream" and said apparatus.

Said patent does not however teach to automatically identify the interface associated with a peripheral and the contents that can be viewed through that peripheral. On the contrary, said document tackles the opposite problem, i.e. sending a video to a peripheral and not receiving a video from a plurality of peripherals.

Professional products are also known, like those used, for example, in filming studios, which allow to select the desired source from a video showing a plurality of images coming from different sources. However, the cost of such devices cannot be compared with that of a household television set, as far as construction complexity is concerned.

Another problem suffered by prior-art television sets is that, if one or more peripherals are off or in stand-by, then they will not be detected and/or shown. This situation is especially uncomfortable when more than one peripheral is off.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112), such that applicant(s) reserve the right to disclaim, and hereby disclose a disclaimer of any previously described product, method of making the product, or process of using the product.

SUMMARY OF THE INVENTION

In this frame, it is therefore one object of the present invention to provide a television set capable of identifying a plurality of peripherals and allowing to select and display the contents of one of the same, so as to speed up the choice of the content of one of the available peripherals.

It is another object of the present invention to provide a television set capable of identifying a plurality of peripherals and allowing to select and display the contents of one of the same, which allows the user to reduce the actions that must be carried out in order to choose the contents of one of the available peripherals, while informing the user about the operating state of the various peripherals.

It is a further object of the present invention to provide a television set capable of identifying a plurality of peripherals and allowing to select and display the contents of one of the same without much affecting the production cost and sale price of the apparatus itself.

These and other objects of the invention are achieved through a television set capable of identifying a plurality of peripherals and allowing to select and display the contents of one of the same as set out in the appended claims, which are intended to be an integral part of the present description and which are not included in the description text for simplicity only.

In summary, the invention relates to a television set capable of identifying a plurality of peripherals and allowing to select and display the contents of one of the same, the television set comprising:

- a plurality of interfaces for receiving at least one source transmitted by said plurality of peripherals;
- a screen for displaying at least the contents of one source;
- a generator of graphic indications for providing on said screen indications about said plurality of interfaces and/or said peripherals;
- a control unit for controlling the functions of said television set;
- control means for issuing commands to said television set; in particular, a command for identifying at least one of said peripherals.

The television set being characterized in that it also comprises:

- a video memory, in particular of the RAM type, capable of storing a plurality of video images obtained by processing said sources coming from said peripherals;
- a processing means adapted to scale the dimensions of said sources, in order to generate said plurality of video images and associate said video images to respective graphic indications relating to said interfaces and/or said peripherals;
- the result of said association being displayed as a whole on the screen, in the form of a general video image, in order to allow the user to identify which interface is associated with the corresponding video image;
- means for selecting one of said video images through a pointing element;
- wherein, in response to a command issued by said control means, the contents of said video image chosen by the user are shown on said screen in their original form, as they come from the corresponding source.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
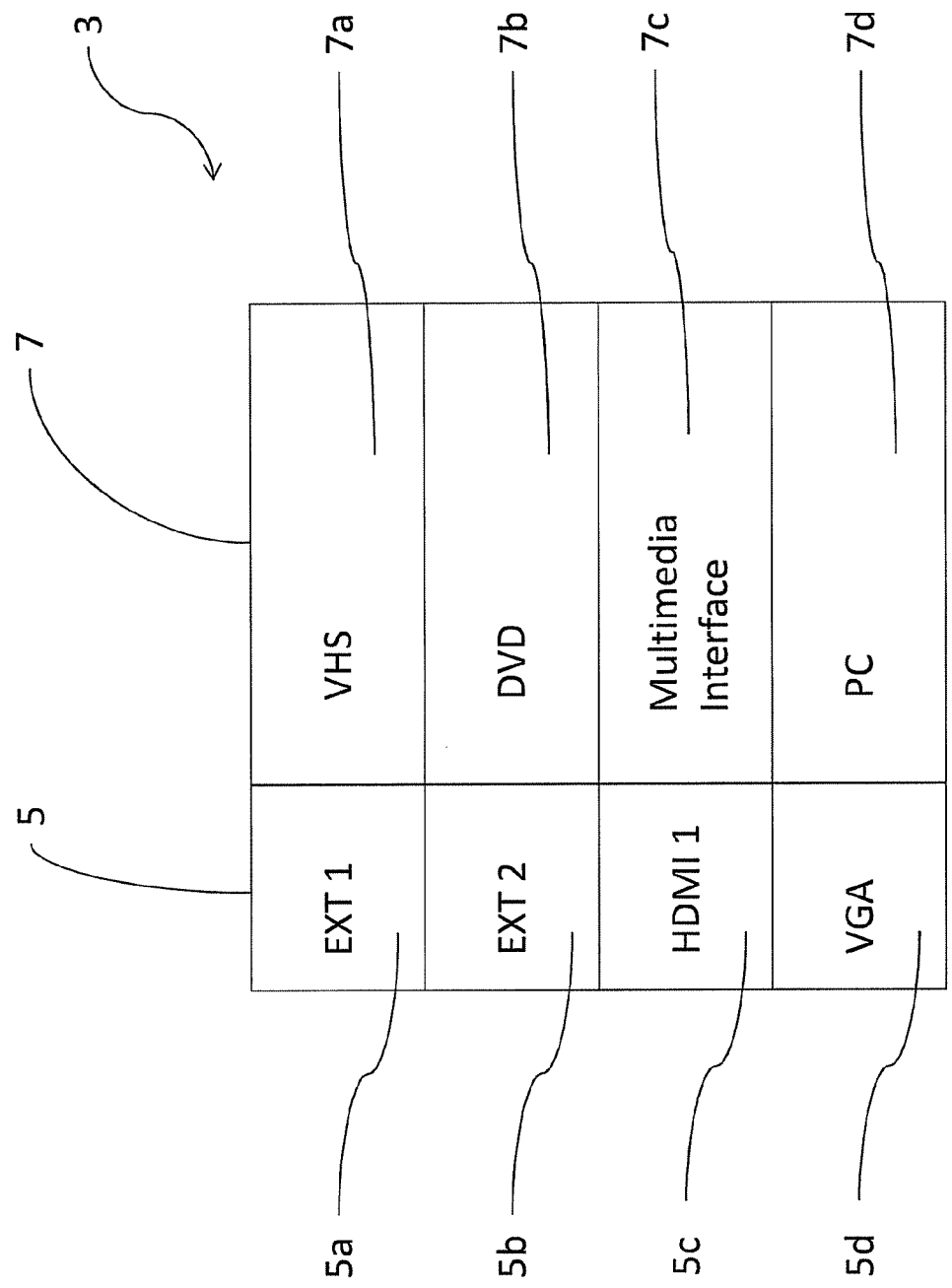
FIG. 1 shows a menu for choosing a peripheral in accordance with the prior art.
Figure 2:
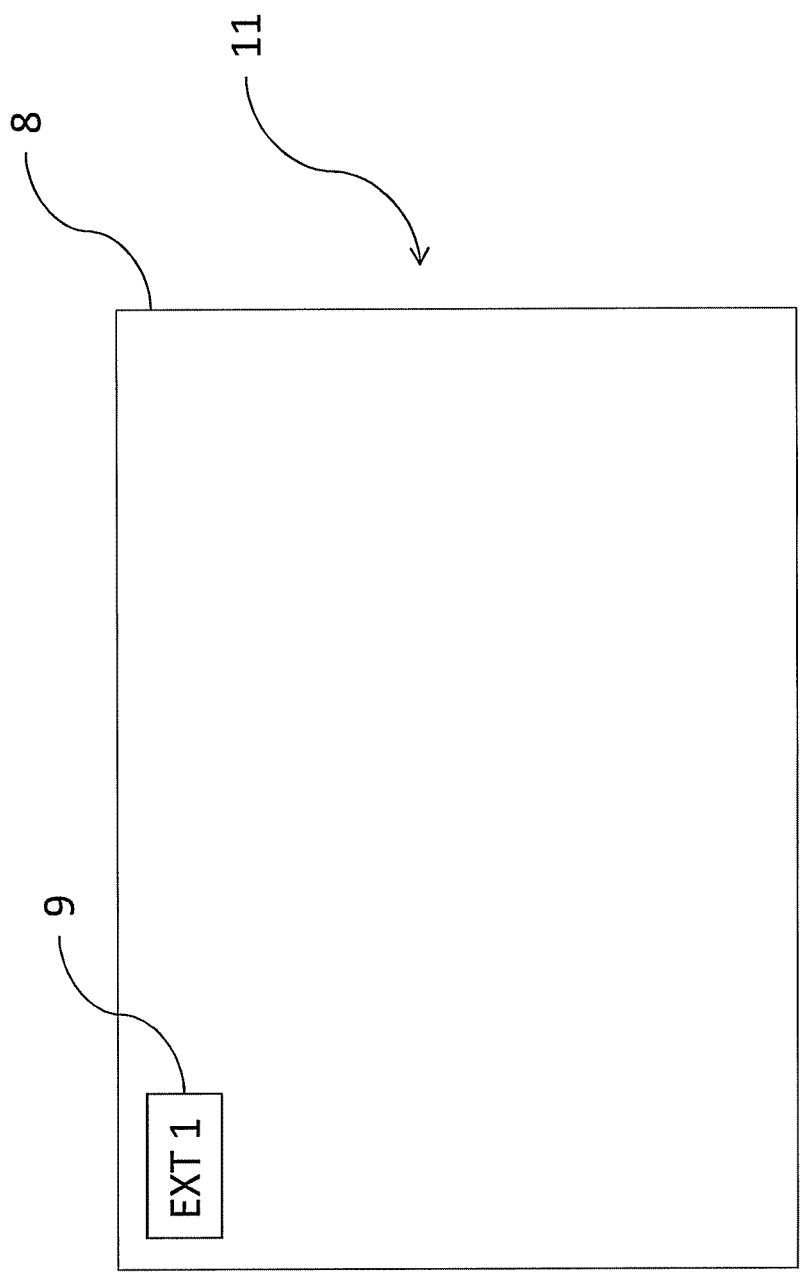
FIG. 2 shows a method of identification of a peripheral associated with a reproduction means known in the art.
Figure 3:
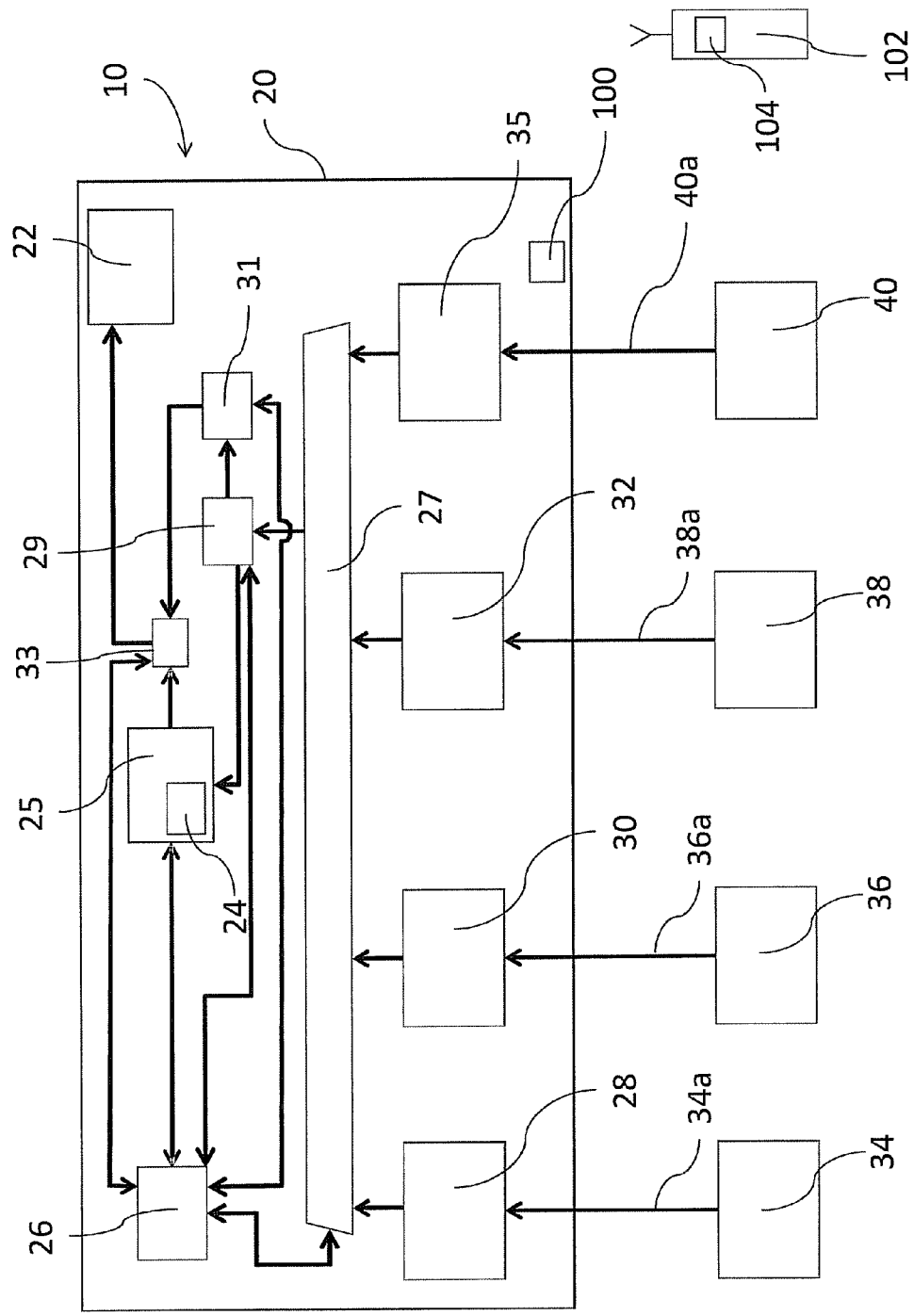
FIG. 3 shows a part of a television set capable of identifying a plurality of peripherals and allowing to select and display the contents of one of the same in accordance with the teachings of the present invention.
Figure 4:
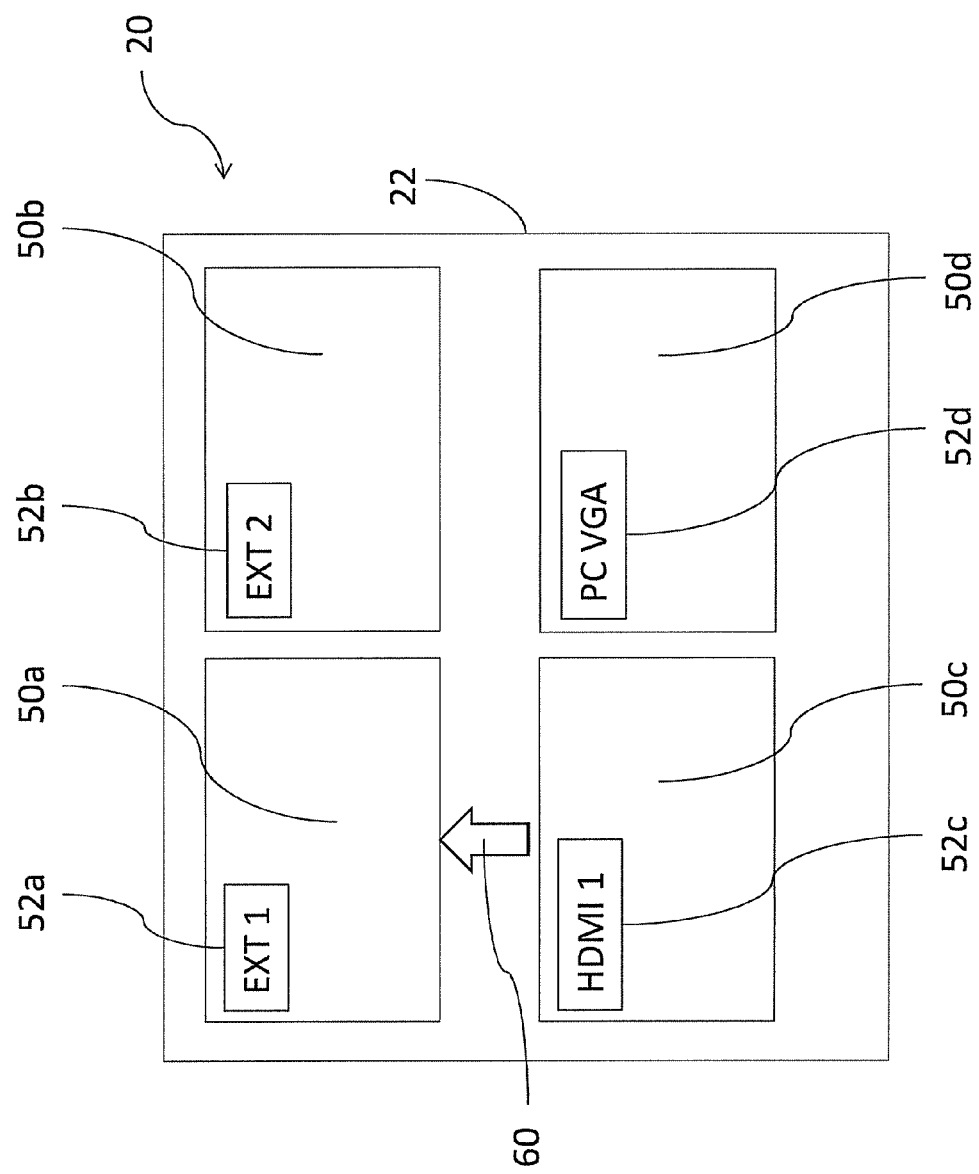
FIG. 4 shows the result of the graphic visualization obtained on the television set in a preferred embodiment of the present invention.

Referring now to FIGS. 3 and 4, there is shown the video processing and display part of a television set 10 that allows to identify a plurality of peripherals 34, 36, 38, 40 connected to a video processing means 20 and to display on a screen 22 the contents of sources 34a, 36a, 38a, 40a provided by said plurality of peripherals 34, 36, 38, 40.

In particular, the video processing means 20 is a part of a television set, and the peripherals 34, 36, 38, 40 are devices adapted to reproduce and transmit data, images and sound, in particular consisting of a DVD reader, a BD reader, an STB (Set Top Box), a multimedia platform, and the like.

Said video processing means 20 comprises a plurality of interfaces 28, 30, 32, 35, each one capable of receiving a source among a plurality of available sources 34a, 36a, 38a, 40a, which are provided by the plurality of related peripherals 34, 36, 38, 40. In particular, the interfaces 28, 30, 32, 35 comprise the input ports of the video processing means 20, e.g. the SCART, HDMI, VGA, S-Video, etc. input ports. Furthermore, said interfaces 28, 30, 32, 35 may also be wireless interfaces allowing communication between the television set 10 and the various peripherals connected thereto, e.g. Wi-Fi wireless interfaces, in particular those using the DLNA (Digital Living Network Alliance) standard, or Bluetooth and NFC interfaces.

The television set 10 also comprises a screen 22 for displaying the normal television programs or the images and/or sequences of images received from said plurality of sources 34a, 36a, 38a, 40a.

According to one example of embodiment of the present invention, the television set 10 is characterized in that the video processing means 20 comprises at least one microcontroller 26, at least a first GPU ("Graphics Processing Unit") 25 and a second GPU 31, and a first switch 27 that, based on control signals received from the microcontroller 26, sends to a second switch 29 at least one source among the plurality of available sources 34a, 36a, 38a, 40a. The switch 29 also sends the source chosen by the first switch 27, under the control of the microcontroller 26, to either the first GPU 25 or the second GPU 31 for reasons that will be explained in detail later on.

The video processing means 20 further comprises a third switch 33 that, under the control of the microcontroller 26, switches to the output of the first or second GPU 25, 31 for the purpose of delivering at least one source 34a, 36a, 38a, 40a to the screen 22.

Preferably, said first and second GPU's 25, 31 may comprise at least one video memory 24, e.g. a video memory of the RAM (Random Access Memory) type.

According to the present invention, said video memory 24 is used during the reproduction on the screen 22 of video images 50a, 50b, 50c, 50d relating to said plurality of sources 34a, 36a, 38a, 40a. In particular, said video images 50a, 50b, 50c, 50d are electric signals containing data coming from said plurality of sources 34a, 36a, 38a, 40a, such as, for example, an image, a frame or a sequence of frames having smaller dimensions than the source signal.

The television set 10 also comprises actuating means 100; 104, e.g. keys or levers, available on a control device 102, in particular a remote control, or on the television set 10 itself.

In a preferred embodiment, each actuation of said actuating means 100; 104 causes the screen 22 to show information adapted to identify a plurality of peripherals and allowing to select and display the contents of one of the same. To attain this result, the first switch 27 carries out a series of cyclic switchings of the outputs of the interfaces 28, 30, 32, 35 at regular time intervals, so as to select one source at a time and to send to the GPU 25 a frame of one source, then another frame of another source, and so on, for further processing; the second switch 29 delivers the source 34a, 36a, 38a, 40a selected by the first switch 27 to the first GPU 25, which then processes at least one source 34a, 36a, 38a, 40a, and the third switch 33 delivers at least one video image 50a, 50b, 50c, 50d to the screen 22. The first GPU 25, in accordance with the commands and processing of the microcontroller 26, can carry out the tasks of acquiring one source 34a, 36a, 38a, 40a at a time and of "downscaling" or "upscaling" the content thereof. A single general image is then composed, which is made up of the whole set of video images 50a, 50b, 50c, 50d (smaller in size due to downscaling or bigger in size due to upscaling) thus obtained from the sources 34a, 36a, 38a, 40a, so as to position said video images 50a, 50b, 50c, 50d simultaneously on the screen 22 as shown, for example, in FIG. 4.

This "downscaling" operation may be executed, for example, by sampling the rows and the columns of a frame coming from said sources 34a, 36a, 38a, 40a by taking one every N pixels (where N is determined as a function of the number of video images 50a, 50b, 50c, 50d to be simultaneously shown on the screen 22), and by using said sampled pixels to create a new frame which is smaller than the previous one. This new frame is then arranged together with other frames coming from the other peripherals in order to obtain a full-screen general image representing the contents of all the video images 50a, 50b, 50c, 50d delivered from the first GPU 25 to the screen 22 through the third switch 33. It should be noted that the term "scaling" refers in general to both downscaling and upscaling in this description.

It is clear that, when the screen 22 receives the plurality of video images 50a, 50b, 50c, 50d to allow the user to select the desired source, the audio of the television set is muted.

In the case of FIG. 4, wherein four video images 50a, 50b, 50c, 50d, having all the same definition, are to be shown simultaneously on the screen 22, the sampling may be done by taking one every two pixels of each horizontal row and one every two rows of each frame.

It should be noted that, in order to avoid any problems of synchronization of different frames coming from independent sources, the switch 27 operates as follows: it first supplies a frame coming, for example, from the source 34a to the first GPU 25; the latter samples it fully as described above and stores it into its video memory 24; then the switch 27 does the same on the frame coming from the source 36a, and so on, in sequence, for the other two frames coming from the sources 38a and 40a. If the sources were all synchronous, the time necessary for completing the cycle would be of four frames; since the sources are not synchronous, however, said time will be longer, but nonetheless it will not exceed eight frames, because the switch 27 needs one frame at most to re-synchronize itself after every switching. In this situation, this video image refresh sequence is considered to be sufficient to ensure the understanding of the video contents produced by the various sources.

The user of the television set 10 can thus know in real time what is available on each peripheral.

It is clear that, since the sources 34a, 36a, 38a, 40a are not only independent of one other, but also have different image definitions, e.g. an HD image (made up of 1920 pixels per row and 1080 rows per frame, or 1280 pixels per row and 720 rows per frame), or an SD image (made up of 720 pixels per row and 480 rows per frame (American standard) or 575 rows per frame (European standard), or other definition types, the microcontroller 26 must first identify the definition type of the source being outputted by the switch 27 and then adjust the downscaling to be applied to the received frames accordingly. In other words, if a general video image 50a, 50b, 50c, 50d is to be created with frames having different definitions, the degree of downscaling applied to the frames coming from the various sources will be different, but the definition of the video images 50a, 50b, 50c, 50d making up the general image displayed on the screen 22 will be the same.

Furthermore, the microcontroller 26, by acting upon the second GPU 31, has the latter associate a graphic indication 52a, 52b, 52c, 52d, relating to at least one interface 28, 30, 32, 35, with the general video image 50a, 50b, 50c, 50d of the sources 34a, 36a, 38a, 40a, so as to allow the user to identify the interface 28, 30, 32, 35 associated with said peripheral 34, 36, 38, 40 and possibly display the contents thereof on the screen 22.

It is clear that the expression "graphic indication" 52a, 52b, 52c, 52d refers to information about the names of the interfaces 28, 30, 32, 35, e.g. "EXT 1", "HDMI 2" and the like.

The television set 10 according to the present invention allows, therefore, to associate the general video image 50a, 50b, 50c, 50d with the graphic indication 52a, 52b, 52c, 52d, thereby allowing the user to identify the interface 28, 30, 32, 35 of the video processing means 20 associated with a peripheral 34, 36, 38, 40 and the contents thereof, thus speeding up the choice of the contents to be displayed on the screen 22 of a source 34a, 36a, 38a, 40a being transmitted to the television set 10 by a peripheral 34, 36, 38, 40. Through the third switch 33, said graphic indication 52a, 52b, 52c, 52d may be superimposed on, or entered as an alternative to, a part of the frame showing the content of one of the various sources 34a, 36a, 38a, 40a. The function of the switch 29 is therefore to supply the frames coming from the various interfaces 28, 30, 32, 35 to the second GPU 31, which thus operates exactly in the same way as the GPU 25, but only for those rows of the "downscaled" images that will have to contain said graphic indications 52a, 52b, 52c, 52d; for the other rows not affected by the insertion of the graphic indications 52a, 52b, 52c, 52d, the images are supplied to the screen 22 by the GPU 25. In the case shown in FIG. 4, the GPU 31 will create that part of the general image to be displayed in full screen that contains the graphic indications 52a, 52b, 52c, 52d (which in this case will be divided into two parts); for example, for a Full HD general image, it will handle 258 frame rows in total.

The user selects one of the video images 50a, 50b, 50c, 50d relating to the sources 34a, 36a, 38a, 40a through actuating means 100; 104, e.g. keys or levers, available on a control device 102, in particular a remote control, or on the television set 10 itself. In particular, at each actuation said actuating means 100 move a pointer 60 visible on the screen 22. Said pointer 60 indicates the video image 50a, 50b, 50c, 50d that the user is selecting at a given instant. After the user has chosen the desired video image 50a, 50b, 50c, 50d, e.g. upon pressing an OK key, the screen 22 will display the content of the corresponding source 34a, 36a, 38a, 40a. In practice, the selection of a peripheral by the user inhibits the switch 27 from continuing to switch the frames periodically and, under the control of the microcontroller 26, forces it to supply to the first GPU 25 always the same content, i.e. the one coming from the selected peripheral. Of course, in this case the first GPU 25 will no longer downscale the frames coming from the selected peripheral, but it will send them to the screen 22 with the original definition. Also the second GPU 31 will stay inactive as long as the user keeps viewing the desired source and until the user actuates the key or lever of the control device 102 adapted to display on the screen 22 the general image of the video images 50a, 50b, 50c, 50d relating to the peripherals 34, 36, 38, 40. Of course, in this full-screen display situation the audio of the television set 10 will be restored.

In particular, FIG. 4 shows the result of the graphic visualization obtained on the television set 10 in one example of operation in accordance with the present invention. In fact, said figure shows a screen 22 which comprises a plurality of video images 50a, 50b, 50c, 50d relating to the sources 34a, 36a, 38a, 40a, a respective graphic indication 52a, 52b, 52c, 52d relating to an interface 28, 30, 32, 35 of the television set 10 being associated with each video image 50a, 50b, 50c, 50d; on the screen 22 there is also a pointer 60. The pointer 60 can be obtained and moved according to any one of the several methods known in the art.

In this example, each video image 50a, 50b, 50c, 50d occupies a portion of the screen 22, and each graphic indication 52a, 52b, 52c, 52d relating to the interfaces 28, 30, 32, 35 is superimposed on the respective video image 50a, 50b, 50c, 50d. Also the pointer 60 occupies a small portion of the screen 22 and is located near the video image 50a, 50b, 50c, 50d chosen by the user at a given instant. It is clear, however, that the position and the shape of the above-mentioned elements may be different. For example, the pointer may be represented by a frame around one of the video images 50a, 50b, 50c, 50d.

Figure 5:
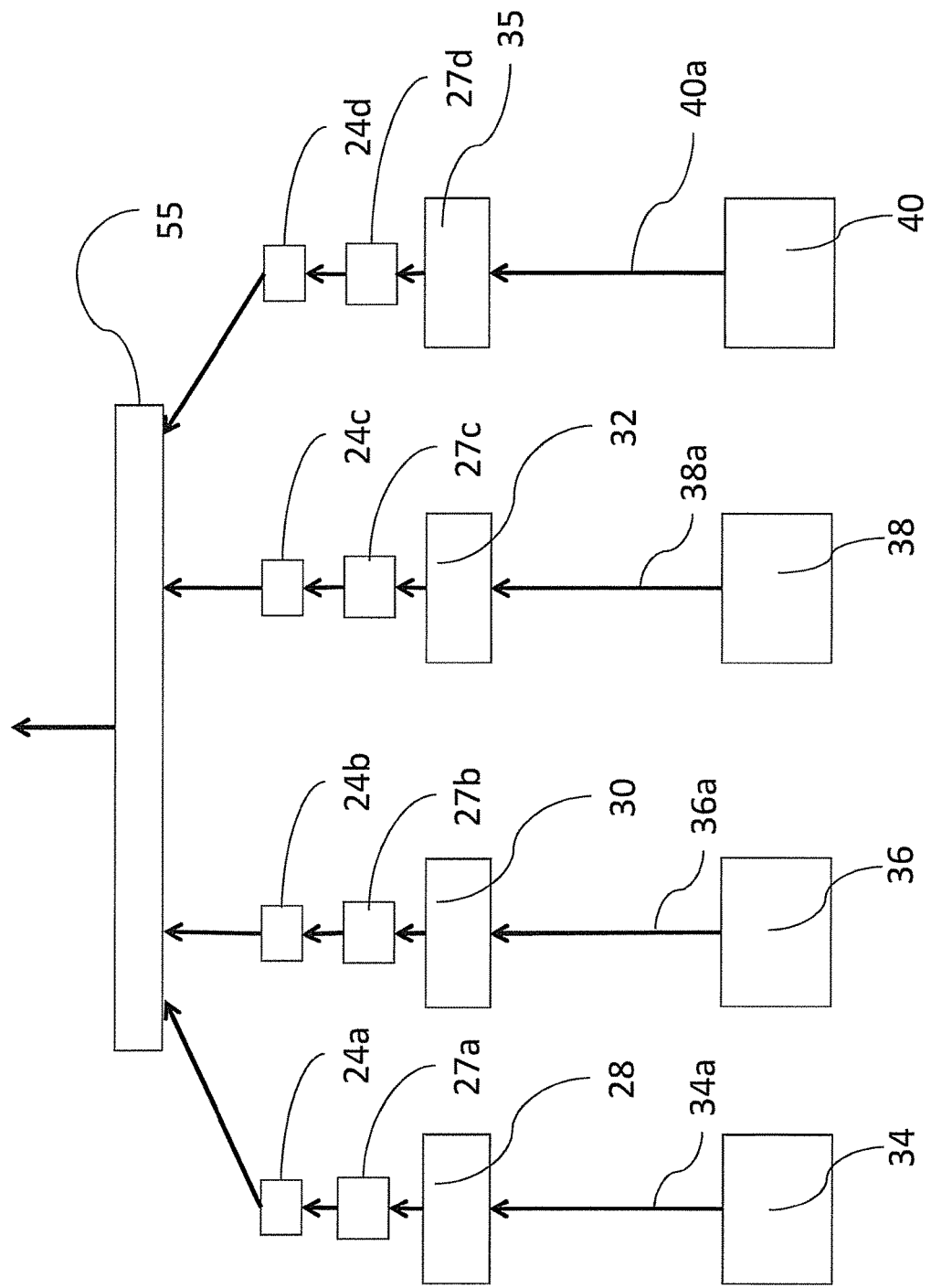
FIG. 5 shows another preferred embodiment of the present invention for scaling and memorizing video images for a sequential read out process.

According to another preferred embodiment of the present invention shows FIG. 5 scaling and memorizing video images for a sequential read out process. According to this embodiment each video signal associated to one of the peripherals (34, 36, 38, 40) is processed by one processing means (27a, 27b, 27c, 27d). The processing means (27a, 27b, 27c, 27d) are adapted to scale the dimensions of said sources (34a, 36a, 38a, 40a), in order to generate a plurality of video images (50a, 50b, 50c, 50d) for storing in a plurality of video memories (24a, 24b, 24c, 24d). The aforementioned elements provide as a result scaled video images stored in the video memories (24a, 24b, 24c, 24d) that are provided with a read out instance (55). The read out instance (55) reads the content of the video memories (24a, 24b, 24c, 24d) sequentially for instance beginning by 24a to 24d. In order to match different peripheral signals consisting of different types because of differences between the frequencies, dimensions, resolution and structure the processing means (27a, 27b, 27c, 27d) condition the sources (34a, 36a, 38a, 40a) for providing ready to read out video images in the video memories (24a, 24b, 24c, 24d) at each time. All of the calculation steps to provide the aforementioned ready to read out video images in the video memories (24a, 24b, 24c, 24d) are made by the processing means (27a, 27b, 27c, 27d). The read out instance (55) acts as an interface to transfer the video images (50a, 50b, 50c, 50d) to the first GPU 25. In this context is possible to read out the video memories (24a, 24b, 24c, 24d) and insert video or image signals that are displayed as a background, instead of a simple colored background. More in details, the background surrounding the video image actually displayed on the screen 22 may be another video image, for example the previous one displayed on the screen or a background on which are contained the graphic indication 52a, 52b, 52c, 52d. It is clear that for reading the content of the video memories (24a, 24b, 24c, 24d) sequentially and to display them sequentially on the screen an appropriate control should be provided on the control device 102.

By way of non-limiting example, let us consider a first source of a DVD reader connected to the television set 10 through the interface "EXT 1", a second source of a BD reader connected to the same television set 10 through the interface "HDMI 1", a third source of a set top box connected through the interface "EXT2", and a fourth source of a personal computer connected through the interface "PC VGA". The user will see on the screen a first image, i.e. the image of the source of the DVD reader, a second image of the source of the BD reader, a third image of the set top box, and a fourth image of a personal computer.

It is apparent that in a television set like the one of the present invention, which operates digitally, for some old interfaces such as SCART and S-Video, which can only receive analog signals, it will be necessary in this case to digitalize the signal coming from the analog peripheral prior to sending it to the GPU's 25 and 31; this means that an analog/digital converter circuit will have to be inserted downstream of the analog interfaces.

Also, such images are refreshed on the screen at predetermined time intervals, as previously explained, depending on the number (N) of downscaled images simultaneously shown on the screen. The case so far taken into account concerned the simultaneous visualization on the screen of four video images 50a, 50b, 50c, 50d relating to four peripherals 34, 36, 38, 40; if nine video images relating to nine peripherals were to be simultaneously shown in real time on the screen 22, the video processing means 20 should comprise nine interfaces connected to the switch 27 and should act in a way similar to that previously explained. The only differences would concern the degree of downscaling (which would increase) and refresh time (which would increase as well). The degree of downscaling applied to the frames coming from the peripherals should be substantially doubled compared to the four-video image case, and the microcontroller 26 should control the first 25 and the second 31 GPU's in such a way as to display on the screen 22 nine video images simultaneously and substantially in real time.

To avoid this situation, that could be uncomfortable for the user, it is possible to overcome this problem by transforming the video signals coming from the said sources (34a, 36a, 38a, 40a) to twice the frequency of the original frame rate, (writing images in a memory and by reading them at a frequency twice that one of writing) and then proceeding as previously described with reference to the downscaling of video images and their subsequent consolidation into a single general image. In this way the refresh time would return to that typical one of when they are shown on the screen 22 four video images.

It is clear that with this technique of upgrading the frame rate of the sources, it is possible nowadays (due to the increased speed time of accessing to RAM memories) to use frame rates (P) up to 200 Hz or 300 Hz and therefore the problem of having low refresh time of the overall image displayed on the screen 22 does not exist anymore, and the user can really get a real-time view of the content of said sources (34a, 36a, 38a, 40a).

Furthermore, a graphic indication of the corresponding interface is associated with each image or frame; therefore, for example, the first image will include the graphic indication "EXT 1" and the second image will include the graphic indication "HDMI 1". It follows that, according to the above-mentioned example, the user can identify the interface associated with a peripheral and can select the desired one on the basis of the contents being shown instant by instant.

In addition, with reference to FIG. 4, the user can see on the screen 22, automatically and simultaneously, a plurality of images or frames which are refreshed with a predetermined frequency, practically in real time; this example shows how easy it is for the user to quickly select one peripheral or another and fully enjoy the associated contents.

By way of non-limiting example, let us now consider a television set 10 equipped with at least one wireless interface, which for simplicity will be referred to as Wi-Fi, e.g. operating in accordance with the DLNA standard, to which a peripheral device is connected, e.g. a notebook computer or a cellular telephone. In this case, the video images to be displayed on a screen of the television set 10 will include, among others, one relating to the source of either the notebook computer or the cellular telephone, although referring to the same interface. The video image's graphic indication will however be different, so that it can be discerned by the user, e.g. "Wi-Fi 1" or "Wi-Fi 2"; this distinction is ensured, for example, by the microcontroller 26 on the basis of the identification protocols exchanged by the television set 10 with the Wi-Fi peripherals connected thereto.

Assuming that a third peripheral, e.g. associated with a tablet, is then connected to the television set 10 through the Wi-Fi interface thereof, the screen will dynamically show a third video image with the graphic indication "Wi-Fi 3", replacing those which were disconnected in the meantime.

Therefore, the numbering of the physical interfaces, i.e. those that require a physical connection to the peripheral, relates to the number of interfaces available in the television set 10 and is set univocally for each interface. For example, if the television set 10 includes three HDMI interfaces, each one of them will have a fixed graphic indication, e.g. "HDMI 1" for the first HDMI interface, "HDMI 2" for the second HDMI interface and "HDMI 3" for the third HDMI interface, and these graphic indications will remain unchanged over time. Instead, the numbering of wireless interfaces is not fixed, but dynamic, and depends on how many wireless peripherals are connected to the television set 10. In fact, as explained in the above example, a given Wi-Fi interface allows connecting more peripherals, with which a graphic indication will be associated which will contain the name of the interface itself, e.g. Wi-Fi, and a progressive number that will depend on the connected Wi-Fi peripheral.

It is clear that, since the DLNA standard transmits compressed videos, these need to be decoded before being sent to the GPU's 25 and 27. Such decoding may also be carried out by the microcontroller 26.

An additional problem of this type of visualization arises when one or more peripherals are off or in stand-by. In such a case, no source will be available at the input of the interface of the peripheral concerned. Since the microcontroller 26, together with the GPU 25, must process the data of the various sources for pixel and row decimation, the various functions of the microcontroller 26 also include ascertaining if there is no signal for a certain number of frames of a source, and deducing that the peripheral associated with that interface is off or disconnected. In such a case, therefore, the microcontroller 26 will instruct the character generator, which is normally used for creating the graphic indications 50a, 50b, 50c, 50d, to prepare a warning message such as "ATTENTION! PERIPHERAL OFF OR DISCONNECTED. PLEASE TURN IT ON OR CONNECT IT". In this way, the user can take the appropriate measure by turning on or re-connecting the peripheral.

A method for identifying a plurality of peripherals 34, 36, 38, 40 connected to a television set 10 according to the present invention will now be described.

In particular, said method comprises the following steps:
receiving signals from a plurality of sources 34a, 36a, 38a, 40a transmitted by said plurality of peripherals 34, 36, 38, 40 to a plurality of interfaces 28, 30, 32, 35;
displaying said plurality of sources 34a, 36a, 38a, 40a on a screen 22;

According to the present invention, said method comprises the following steps:
reducing the dimensions of a plurality of sources 34a, 36a, 38a, 40a by decimating the row pixels and the number of rows forming the source images;
storing, through at least one memory means 24, a plurality of video images 50a, 50b, 50c, 50d obtained from said plurality of sources 34a, 36a, 38a, 40a according to the preceding step;
associating, through at least one processing means 25, 26, said plurality of video images 50a, 50b, 50c, 50d of said plurality of sources 34a, 36a, 38a, 40a with a plurality of graphic indications 52a, 52b, 52c, 52d relating to said plurality of interfaces 28, 30, 32, 35;
automatically displaying on the screen 22 of a television set 10, upon a user's command, the whole set of said associations, so as to allow the user to identify the interfaces 28, 30, 32, 35 associated with the contents of said plurality of peripherals 34, 36, 38, 40 and to select the content of one of said peripherals 34, 36, 38, 40 on the basis of the content shown in real time on the screen.

Said graphic indications 52a, 52b, 52c, 52d may be an electronic signal in on-screen display form, comprising data relating to said interface 28, 30, 32, 35, in particular video and/or audio data. For audio data, instead of the on-screen display system one may use a voice synthesizer generating the name of the interface selected by a pointer. In this latter case, the language of the voice synthesizer may be selected by the user while installing the television set, the installation procedure already including a step of defining the language to be used for showing graphic indications to the user.

The features of the present invention, as well as the advantages thereof, are apparent from the above description.

A first advantage of the present television set capable of identifying a plurality of peripherals and allowing to select and display the contents of one of the same is that it allows to quickly choose the content of one of the available peripherals.

A second advantage of the television set according to the present invention, and of an associated method, is that the user identifies which interface of the television set 10 is associated with a peripheral when the same peripheral is off, and the user is informed about what he/she has to do to restore it.

A third advantage of the television set according to the present invention, and of an associated method, is that it reduces the actions that the user needs to carry out in order to identify which interface of a television set 10 is associated with a peripheral and, thanks to a general view of the contents available from the various peripherals, it speeds up the fruition of the contents of the source being transmitted by the peripheral.

A further advantage of a television set capable of identifying a plurality of peripherals and allowing to select and display the contents of one of the same is that these functions are implemented by using components which are normally available on the consumer market without much affecting the cost of the television set.

The system for identifying a plurality of peripherals connected to a television set and the contents thereof, as well as the associated method, may be subject to many possible variations without departing from the novelty spirit of the inventive idea; it is also clear that in the practical implementation of the invention the illustrated details may have different shapes or be replaced with other technically equivalent elements.

For example, if eight or more video images were to be shown within a single video image on the screen of the television set, they could be shown in two successive screens displayed alternatively, with the possibility of choosing the one of interest for the user by means of the control keyboard.

Another possible variation consists of using only one GPU (Graphics Processing Unit) instead of two, e.g. the GPU 25, to which the switch 27 supplies the frames of the sources 34a, 36a, 38a, 40a. In this case the work done by the second GPU 31 in the case shown in FIG. 3, i.e. creating the graphic indications 52a, 52b, 52c, 52d, could be done by a suitable character generator included in the GPU 25. Moreover, the GPU 25 could be the normal RAM video memory used in the television set for controlling the LCD.

It can therefore be easily understood that the present invention is not limited to a television set capable of identifying a plurality of peripherals connected to the television set itself and the contents thereof, as well as to an associated method, but may be subject to many modifications, improvements or replacements of equivalent parts and elements without departing from the inventive idea, as clearly specified in the following claims.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A television set comprising:
a plurality of interfaces configured to receive a plurality of sources transmitted by a plurality of peripherals;
a screen configured to display at least one of said sources;
a generator of graphic indications configured to show on said screen indications relating to said plurality of interfaces and/or said peripherals;
a control unit configured to control the functions of said television set;
a control means configured to issue commands to said television set;
a video memory configured to store a plurality of video images obtained by processing said sources coming from said peripherals; and
a processing means configured to scale dimensions of said sources, in order to generate said plurality of video images and to associate said video images with respective graphic indications relating to said interfaces and/or said peripherals;
wherein the television set is configured to display the result of said association as a whole on the screen, in the form of a general video image, in order to allow a user to identify which interface and/or peripheral is associated with the corresponding video image;
wherein the television set is configured so that, after one of the video images is selected by a user, the contents of said selected video image are shown on said screen; and
wherein said sources, before being supplied to said processing means, are transformed through appropriate transforming means into video signals having a frame rate of P times greater, where P is an integer greater than one, with respect to the original ones coming from said devices.

2. The television set according to claim 1;
wherein the processing means comprises a switching device; and
wherein each of said video images consists of an electronic signal containing data relating to said source and organized as a sequence of frames making up a video image which is supplied to the switching device.

3. The television set according to claim 2;
wherein said processing means comprises a first graphics processing unit configured to:
receive said sources,
process the sources in order to scale their dimensions;
store the processed video images in said video memory means; and
organize at least a part of said video images into a general video image, which is then sent to said screen by said graphics processing unit.

4. The television set according to claim 3;
wherein said sources are supplied to inputs of said switching device;
wherein the switching device, under the control of said control unit, cyclically and sequentially supplies one frame of each source of said plurality of sources to said first graphics processing unit; and
where the first graphics unit processes each frame, thereby scaling its dimensions, prior to receiving another frame of another source.

5. The television set according to claim 3, further comprising:
a second graphics processing unit comprising said generator of graphic indications which are shown on said screen in a part of said general video image;
wherein said second graphics processing unit is only active for those frame rows of said general video image that contain said graphic indications.

6. The television set according to claim 5;
wherein graphic indications shown on said screen in a part of said general video image are either superimposed on or entered as an alternative to said video images.

7. The television set according to claim 5, further comprising:
a further switching device which, under control of the control unit, supplies to said first or second graphics processing unit said frames of the different video images and switches the signals outputted by said first or second graphics processing unit towards said screen.

8. The television set according to claim 1;
wherein the scaling in the dimensions of said sources is obtained by sampling rows and columns of a frame, taking one every N pixels, where N is determined as a function of the number of video images to be shown simultaneously on said screen.

9. The television set according to claim 8;
wherein, if said video images supplied to said switching device have a different definition, the control unit will first identify a definition type of each source outputted by the switching device and then adjust a definition scaling to be applied to the frames of the different sources so as to obtain, on the screen, video images having a homogeneous definition.

10. The television set according to claim 7;
wherein said second graphics processing unit generates a pointer or highlighting element, which identifies one of said video images shown on the screen and which can be moved by the user through said control means in order to determine which one of said sources should be displayed in full screen;
wherein said control means includes a confirmation key for confirming the choice of the source to be displayed; and
wherein, upon pressing said confirmation key, said control unit inhibits the operation of the second graphics processing unit and, through said further switching device, switches the selected source directly towards said screen without scaling the dimensions of said selected source.

11. The television set according to claim 4;
wherein a refresh frequency of said video images s a frequency which is M times less than the frame frequency of said video images, where M is at most twice the number of video images contained in said general image which is sent to said screen.

12. The television set according to claim 1;
wherein, if one or more inputs of said interfaces receives video signals in analog form, there is at least one analog/digital converter connected between said input receiving the analog signal and said switching device.

13. The television set according to claim 1, further comprising:
at least one wireless interface;
wherein a source coming from said wireless interface, after being decoded by suitable decoding means, is supplied to said processing means in order to produce at least one video image, which is included in said general video image.

14. The television set according to claim 1;
wherein said control unit is configured to analyze the contents of said sources and, when there are no contents for a certain number of frames of a given source, to instruct said generator of graphic indications to generate a written warning message for the user, thereby signaling that the peripheral providing said given source might be off or disconnected from the associated interface.

15. The television set according to claim 1, further comprising:
a voice synthesizer which generates a name of the interface selected by said pointer.

16. The television set according to claim 15;
wherein a language of the voice synthesizer is selected by the user while installing the television set, the installation procedure already including a step of defining the language to be used for showing graphic indications to the user.

17. The television set according to claim 1;
wherein said plurality of video images are displayed through more than one general video image; and
wherein the general video image of interest for the user is selected through said control means.

18. The television set according to claim 3, further comprising:
wherein the first graphics processing unit is the only one graphics processing unit capable of receiving said sources and of processing them by reducing their dimensions;
wherein said first graphics processing unit comprises said generator of graphic indications for showing on said screen indications relating to said plurality of interfaces.

19. The television set according to claim 13;
wherein said control unit is configured to:
identify which peripheral is connected to the television set through a wireless connection on the basis of identification protocols exchanged between the television set and said wireless peripherals; and
assign to each of the wireless peripherals a graphic indication, the name of which depends on which wireless peripheral is connected at a given instant of use of the television set.

20. A television set comprising:
a plurality of interfaces configured to receive a plurality of sources transmitted by a plurality of peripherals;
a screen configured to display at least one of said sources;
a generator of graphic indications configured to show on said screen indications relating to said plurality of interfaces and/or said peripherals;
a control unit configured to control the functions of said television set;
a control means configured to issue commands to said television set;
at least one processing means configured to scale dimensions of said sources, in order to generate said plurality of video images and to associate said video images with respective graphic indications relating to said interfaces and/or said peripherals; and
a plurality of video memories configured to store at least one scaled image of the plurality of video images obtained by processing said sources coming from said peripherals;
wherein the television set is configured to display the result of said association as a whole on the screen through a read out instance by reading out sequentially said at least one scaled image from said plurality of video memories, in the form of a general video image or in the form of a general video image combined with a background signal, said background signal being from one of said peripherals or being a default background signal, in order to allow the user to identify which interface and/or peripheral is associated with the corresponding video image; and
wherein the television set is configured so that, after one of the video images is selected by a user, the contents of said selected video image are shown on said screen; and
wherein said sources, before being supplied to said processing means, are transformed through appropriate transforming means into video signals having a frame rate of P times greater, where P is an integer greater than one, with respect to the original ones coming from said devices.

* * * * *